United States Patent
Montgomery et al.

[11] Patent Number: 5,825,188
[45] Date of Patent: Oct. 20, 1998

[54] METHOD OF MAPPING AND MONITORING GROUNDWATER AND SUBSURFACE AQUEOUS SYSTEMS

[76] Inventors: Jerry R. Montgomery, 4738 W. Harmon Rd., West Valley City, Utah 84120; Thomas A. Phillips, 6706 S. Candle Cove, Salt Lake City, Utah 84121

[21] Appl. No.: 757,591

[22] Filed: Nov. 27, 1996

[51] Int. Cl.⁶ .............................. G01V 3/02; G01V 3/04; G01V 3/00
[52] U.S. Cl. ........................... 324/357; 324/345; 324/359
[58] Field of Search ................................. 324/357, 345, 324/346, 347, 354, 355, 359, 360, 361, 362, 353, 352

[56] References Cited

U.S. PATENT DOCUMENTS

| | | |
|---|---|---|
| 3,147,429 | 9/1964 | Moran . |
| 3,690,164 | 9/1972 | Gabillard et al. ........................ 324/357 |
| 3,759,097 | 9/1973 | Cushing . |
| 4,063,161 | 12/1977 | Pardis . |
| 4,181,014 | 1/1980 | Zuvela et al. . |
| 4,455,529 | 6/1984 | Sinclair . |
| 4,792,757 | 12/1988 | Vail, III et al. . |
| 4,849,699 | 7/1989 | Gill et al. . |
| 4,994,747 | 2/1991 | Stolarczyk . |
| 5,065,100 | 11/1991 | Vail, III . |
| 5,495,175 | 2/1996 | Ramirez et al. . |

OTHER PUBLICATIONS

Beasley et al., "Three-dimensional Mise-a-la-masse Modeling Applied to Mapping Fracture Zones", *Geophysics*, vol. 51, No. 1, Jan. 1986, pp. 98-113.

Tweeton et al., "A Field Test of Electromagnetic Geophysical Techniques for Locating Simulated In Situ Mining Leach Solution", *United States Department of the Interior*, Bureau of Mines, RI 9505, 1994, pp. 1-34.

*Primary Examiner*—Walter E. Snow
*Attorney, Agent, or Firm*—Trask, Britt & Rossa

[57] ABSTRACT

An electromagnetic method is disclosed that can be used to map, track, and monitor subsurface water or solutions and related geologic structure including: groundwater, groundwater channels, groundwater structures, subsurface pollution plumes, locate the source of springs or seeps, map interconnected fracture or porous zones, map leaks in earthen dams, map leaks in drain fields, monitor changes in subsurface water flow, monitor changes in ion concentration in groundwater, monitor in situ leaching solution, monitor movement of heap leaching solutions, monitor changes in subsurface redox or reaction fronts, monitor underground chemical reactions, monitor subterranean bioreactions, or other subsurface waters and related geologic structures. An electric current is injected directly into the water or solution that is to be mapped, tracked, or monitored. It is also necessary to provide a return path for the injected electrical current. The return path for surface expressions is provided by wire to another contact point or points with the earth. The resulting surface magnetic and electric field is measured and interpreted to determine what is occurring in the subsurface.

14 Claims, 3 Drawing Sheets

METHOD OF MAPPING AND MONITORING GROUNDWATER AND SUBSURFACE AQUEOUS SYSTEMS

FIELD OF THE INVENTION

This invention relates to the use of electromagnetic energy injected into an underground aqueous system being investigated, to map, track, and monitor subsurface water or solutions and related geologic structure. More specifically it relates to a method to map, track, and monitor: groundwater, groundwater channels, groundwater structures, subsurface pollution plumes, map interconnected fracture or porous zones, map leaks in earthen dams, map leaks in drain fields, monitor changes in subsurface water flow, monitor changes in ion concentration in groundwater, monitor in situ leaching solution, monitor movement of heap leaching solutions, monitor changes in subsurface redox or reaction fronts, monitor underground chemical reactions, monitor subterranean bioreactions, or other subsurface waters and related geologic structures.

BACKGROUND OF THE INVENTION

Description of prior art: The current technique for tracking groundwater or subsurface solution involves indirect geophysical methods such as various forms of galvanic resistivity, electromagnetic conductivity, ground penetrating radar, or the drilling of many observation wells for monitoring.

The disadvantages of resistivity and conductivity surveys are that they are indirect methods and map low resistivity zones that may or may not be associated with the particular water course in question. The various classical surface electrical resistivity and/or conductivity techniques map resistivity lows or conductivity highs. There is no assurance that the various anomalies are interconnected or just how they relate to the water or solution of interest. There can be two adjacent resistivity anomalies that may or may not be connected because of stratigraphic interferences or problems. Classical resistivity and conductivity technologies have difficulty separating such features because they rely on measurements taken over a broad area. Classical resistivity and conductivity methods do not isolate the feature of interest thus adjacent features can appear as contiguous features even though they may or may not be connected.

The idea of directly connecting or nearly directly connecting to an ore body is utilized in the Mise-a-la-masse method. In this method, resistivity or induced polarization (IP) is used as a detection mode and the technique does not require the electrodes to be in contact with the body being studied (Beasley, C. W., and S. H. Ward, 1986, "Three-dimensional Mise-a-la-masse Modeling Applied to Mapping Fracture Zones," Geophysics vol. 51 p. 98–113, the contents of which are hereby incorporated by reference). Mise-a-la-masse technology is utilized for detection of mineralization that was just missed by drilling.

All the classical geophysical methods for monitoring subsurface water or solutions were tried in tests conducted by the Bureau of Mines, Sandia National Laboratories, University of Arizona, and Zonge Engineering. Tests were conducted on copper mineralization located near Casa Grande, Ariz. using the best known geophysical resistivity and electromagnetic technologies for tracking groundwater or underground solutions (Tweeton, D. R., J. C. Hanson, M. J. Friedel, B. K. Sternberg, and L. J. Dahl, "A Field Test of Electromagnetic Geophysical Techniques for Locating Simulated In Situ Mining Leach Solution," Dept. of Interior, Bureau of Mines, RI 9505, 1994, the contents of which are hereby incorporated by reference). These tests represent the state-of-the-art in geophysical methods currently practiced in the field.

Ground penetrating radar works on very shallow targets and where there is no clay in the soil. Its use for tracking groundwater or underground solutions of any depth is limited.

The drawback to drilling is that you only identify what is at the location of the drill hole. To establish linkage between holes it is necessary to use a tracer solution or some geophysical continuity test. The geophysical techniques used to prove connectivity between holes is to place an electrode in one hole at the horizon of interest and then lower another electrode in the second hole to see if there is a response at the horizon of interest in the second hole. This technique establishes connectivity but does not provide a surface trace of the path that the water follows between the drill holes. With drilling it is difficult to map confidently a subsurface water system, follow subsurface pollution plumes, identify all branches of a groundwater source, or recognize all offshoots of a pollution plume. In addition, it is possible to miss a narrow stream of groundwater with a well and thus produce inconclusive or misleading results.

A method to map groundwater plumes using electrical resistance tomography (ERT) and electro kinetic system (EKS) was developed by researchers at the University of California, Oakland, (U.S. Pat. No. 5,495,175, dated February 1996, A. L. Ramirez, J. F. Cooper, and W. D. Daily, hereinafter the "175" patent, the contents of which are hereby incorporated by reference). The method places many electrodes on the surface and in wells and measures all combinations of resistivity between them. Then the water or fluids are caused to move using electro kinetics and subsequently the many resistivity combinations are remeasured. This data is then combined to create a tomography picture that results from the displacement of the plume. The "175" patent uses only resistivity and tomography.

Technology has been developed that uses electromagnetic energy to locate underground pipes and wire (U.S. Pat. No. 4,063,161, dated December 1977, R. J. Pardis, the contents of which are hereby incorporated by reference).

SUMMARY OF THE INVENTION

An electric current injected directly into the groundwater or aqueous system to be tracked creates an electrical field measurable at the surface and a magnetic field which emanates from the ground water which are monitored and interpreted to elucidate the nature and direction of such aqueous system. To accomplish this at least one electrode must be placed in direct contact with, or in close proximity to, the aqueous system to be investigated. If the aqueous system to be tracked has a surface expression, an electrode is placed in the aqueous system flowing from the earth. Additional electrodes are placed in appropriate positions to provide a return path for the current. Such additional electrodes do not need to be in contact with said aqueous system. The wire used to connect the return electrode is run outside the area of investigation to minimize the effect of the wire's electric and magnetic fields in the data. The current that is conducted through the water path to the return electrode completes the circuit. The system is arranged so that the flow of current is roughly in a large loop. This facilitates interpretation of the water course because the magnetic field produced and monitored can be treated as one part of a simple loop, see FIG. 1. The electric field in this leg can be treated as a dispersed current. An electric or potential map of the diffused current is used to map the location of water or solutions in the ground. An ammeter in the circuit measures changes in conductivity/resistivity of the circuit. Since the changes in conductivity can only occur in the water system, such measurement is an indicator of changes in channel composition, flow rate and the like.

If the aqueous system is subsurface, an electrode is placed in it via a well or drill hole. It is also necessary to provide a return path for the injected electrical current. For subsurface sources this technology uses, as a second or return electrodes, one that is placed in contact with the earth below the water horizon of interest, see FIG. 2. When the deeper electrode option is not available then a distant electrode or electrodes are used.

The electrodes are connected to a controlled source of DC or AC current. Power is provided by a generator, also referred to as the transmitter or generator base station. The current is filtered and controlled to provide a locked pulse or frequency between the transmitter and receiver. Output voltage and current in the loop are controlled, monitored, and recorded during the survey, and corrected for any transmitter drift. All readings are locked to a base station and corrected for diurnal drift.

Data is collected at each magnetic field detection station using special receivers. The receiver for measuring the magnetic field consists of: (1) a coil to generate an electric field from the magnetic field flux passing through, (2) a mechanism to level the coil, (3) a mechanism to move the coil between the horizontal and vertical positions, (4) a mechanism to rotate the coil when positioned in the horizontal or vertical position, (5) an apparatus for measuring the compass bearing of the coil, (6) filters and tuning circuits to filter out all extraneous fields (noise) fluctuating at any frequency other than transmission frequency, and (7) amplifiers and multipliers to produce a signal that can be displayed and recorded.

The magnetic signal picked up in the coil is correlated with the transmitter signal and filtered for noise. The correlated amplifier voltage induced by the magnetic field at each detection site is measured. Magnetic field measurements consist of magnitude and direction of all magnetic field components. Magnetic field direction is obtained by determining the orientation of the receiver coil, see FIG. 3. The orientation of the magnetic coil may be placed, sequentially, in three axes to measure the maximum magnetic field occurring in each particular axis, or three coils could be used, two coils, for example, in a horizontal plane oriented at 90° to one another and a third coil vertically oriented.

The electric signal is detected using grounded surface electrodes and a receiver which are locked with the transmitter and filtered for noise. The corrected amplifier voltage is measured. Electric field measurements consist of magnitude and direction of all horizontal electric field components. Electric field direction is measured by the orientation of the dipole used to measure the magnitude of the electric field, see FIG. 4.

Using vector analysis, distance corrections, profile plots, modeling, contouring, and other reduction methods described later, the relevant properties of the magnetic and electric fields at each station are thus calculated and plotted. Using all or part of this data depending on the subsurface information needed, it is possible to map the subsurface path and activities of groundwater and subsurface solutions on the surface.

DETAILED DESCRIPTION OF THE INVENTION AND EXAMPLES

The invention described herein uses electromagnetics to map, track, and monitor subsurface aqueous systems, i.e., ground water solutions, and related geologic structure. This technology uses the magnetic and electric field produced by a precisely controlled electrical current introduced into the groundwater solution of interest. The electric current thus flows in the groundwater conductor which creates a magnetic field around the conductor, which is the groundwater. By monitoring the magnetic and electric fields, the path of the groundwater can be mapped from the surface. The changes that occur in the magnetic and electric fields and how they vary with time can be used to map and monitor activity such as seasonal fluctuations, pumping, in situ leaching, chemical or biological reactions that are taking place in subsurface solutions. These properties are measured using surface readings. Because this technology directly energizes the target horizon there is confirmation that the signal being measured is coming from the designated or desired target.

The most elementary model which demonstrates the principle of how this technology works is to consider what happens when electric current flows in a wire. A magnetic field is produced that circles the wire. The direction and character of magnetic field is defined by the well-known "right hand rule." If a conductive stream of water or solution replaces the wire, electric and magnetic fields will form directly above the water channel. The magnetic field will be horizontal and perpendicular to the conducting zone just as it would be for a wire. This is also true for a curved conductor. The strongest field strength will be measured directly over the conductor. If measured, the magnetic field traces a path on the surface that follows the path of the conductor, i.e., water, in the ground.

Figure 1:
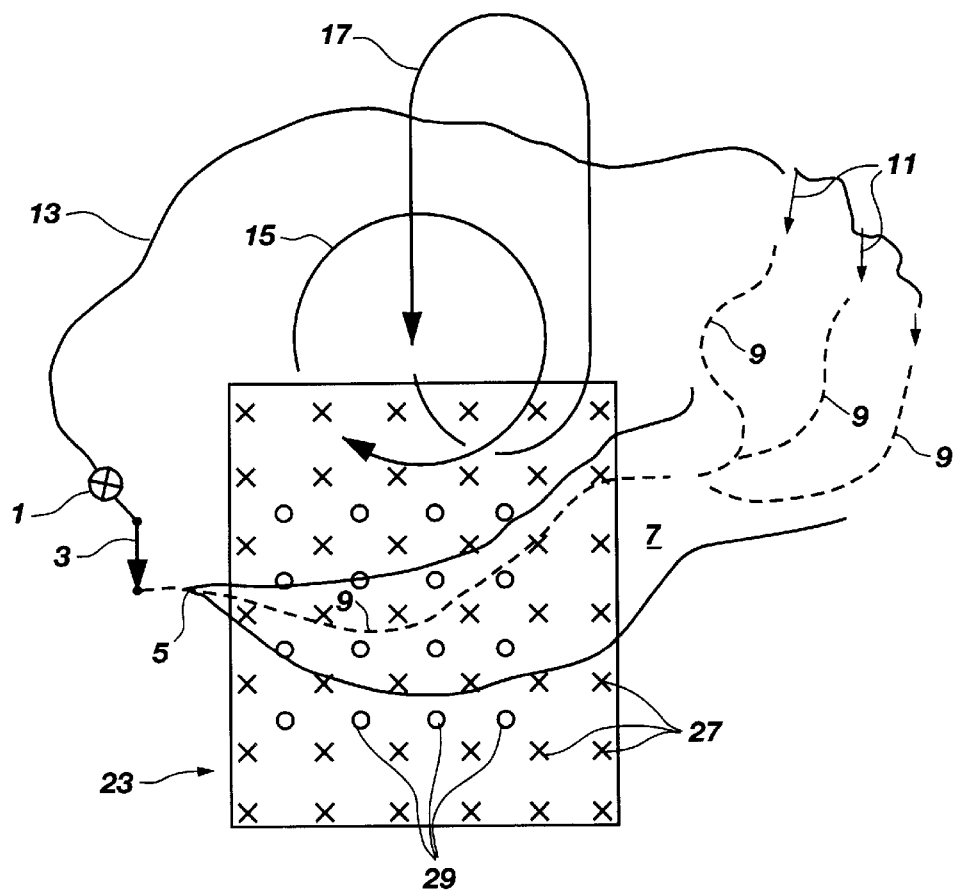
FIG. 1 schematically illustrates a typical circuit diagram of the invention for measuring aqueous systems which have surface expressions.

FIG. 1 schematically illustrates the invention for use in measuring an aqueous system with a surface expression. A generator 1 is connected to the energizing electrode 3, which in turn is placed in the seep 5. The seep 5 represents the surface expression of the groundwater 7 (groundwater is also referred to herein as the aqueous system). The groundwater electric current path 9 is shown as a dotted line passing from the seep 5 through the groundwater 7 and returning to the return electrodes 11. The return electrodes 11 are connected to the generator 1 via a connecting wire 13 completing the electric loop. The connecting wire 13 is placed on the surface preferably far away from the region under investigation. The electrical circuit typically includes instruments for measuring the voltage and current injected and at what frequency if AC is used to stimulate the aqueous system. Such instruments usually include a voltmeter, ammeter, signal analyzer, etc. Elementary electromagnetic theory teaches that when current flows through a loop of wire 15, magnetic field flux lines 17 will pass through the electric loop in accordance with the familiar right-hand-rule.

Figure 2:
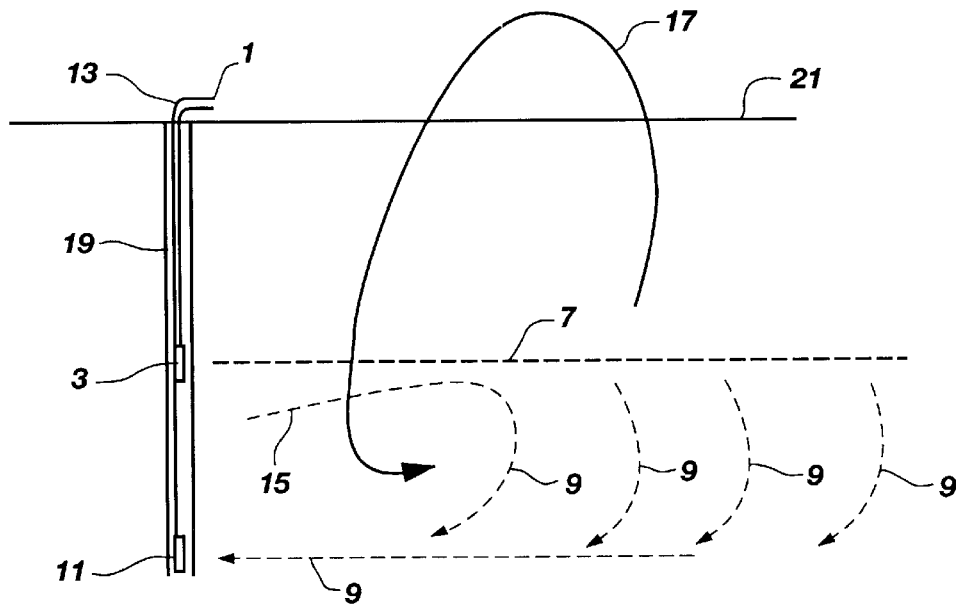
FIG. 2 schematically illustrates a typical circuit diagram of the invention for measuring subsurface aqueous systems. The circuit loop is vertical in this case, but conceptually similar to the primary loop of a single turn air core transformer.

FIG. 2 schematically illustrates the use of the invention for measuring subsurface aqueous systems. In FIG. 2, the generator 1, is connected to the energizing electrode 3 which energizes groundwater 7 at the target horizon or depth. The energizing electrode 3 and return electrode 11 are located in a well 19. The electric current path 9 is represented by dotted lines passing through the groundwater to the return electrode 11 at a point below the groundwater 7. Conceptually, it would also be possible for the return electrode 11 to be above the target horizon instead of below. The electric current loop 15 is completed by connecting the generator 1 to the return electrode 11 by a connecting wire 13 through the well 19. Again, the magnetic field loop 17 will pass through the electric current loop 15, allowing measurement on the surface 21.

To create a current flowing in the groundwater, an electrode is placed in the solution to be studied. In the least complicated situation, a single electrode in the groundwater or site of interest would produce the strongest signal from the underground conductor. However, in the real world there are no mono poles and a second electrode is preferably required. An important part of this technology is that the groundwater or medium of interest is directly energized. Direct energizing of such a target can be accomplished in several ways but ultimately all achieve the same effect. The electromagnetic signal that is measured at any point in the survey is a compilation of the current flowing in the earth and the field created by the wires leading to the electrodes energizing the groundwater. Some of the various ground connections are described in the following but are not limited to:

1. Targets that have a surface expression such as a seep, spring, leak in an earthen dam, leaking drain fields, or other surface expressions of subsurface water leaks. This technology requires that the first electrode be placed directly in the seep, spring, or other surface expression to energize directly the concerned fluid. The second electrode can be a single point electrode or a set of electrodes. The second electrode only provides a return path for the energizing current put into the first electrode. A power source providing electrical energy at a predetermined, constant frequency and voltage is connected between the first electrode and at least one ground electrode. There are several ideal types of return conductors like distant fences or other conductors that are running perpendicular to or across the suspected subsurface flow. For a leak in a dam the second set of electrodes is placed in the impounded water. This forms a loop, see FIG. 1.

2. Targets with no surface expression that are located in the subsurface require the use of a well or other previously drilled hole. It is preferable for the bottom of the drill hole used for the electrode to be below the target area so that it may be used as the return electrode as well. By placing an electrode in the hole the groundwater of interest can also be directly energized, see FIG. 2. With this condition, the wire leading to the return electrode is not a significant influence. One or more surface electrodes can be used but the influence of the return electrode wire has to be accounted for.

The circuit formed is a large single turn loop consisting of: the electrode in the groundwater, the wire connecting it and a set of return electrodes, the return electrodes, and the groundwater between the electrodes, see FIG. 1. This loop creates the equivalent of a single turn primary coil of an air core transformer. Thus, theory developed for electric and magnetic fields produced by a single turn loop can be used to interpret this data. This technology in particular deals with that portion of the single turn loop that is formed by the completion of the circuit via the groundwater, the grounded portion of the loop. The grounded portion of this loop creates magnetic and electric fields that are controlled by how the groundwater is distributed in the area between the electrodes. The magnetic field strength will be directly proportional to the current in the groundwater and inversely proportional to the distance above the groundwater. Surface measurements made of both the magnetic field strength and the direction of the magnetic field provide information concerning the position, orientation, and conductivity of the groundwater. Electrical field mapping provides additional information relating to the distribution of the current flowing in the ground water which can be related directly to the subsurface water distribution.

This invention is based on the concept that electrical current injected into a groundwater source will preferentially follow the groundwater because it is the best conductor. If no other factors influence the electric current, the magnetic field measurements at the surface will be strongest at the point closest to the groundwater generating the field. This permits the tracing of the underground path through the use of surface maps made from measurements at numerous surface locations of the magnetic and electric fields produced by the underground conductor.

Pure water is a relatively poor conductor. However, groundwater and aqueous solutions are never pure water and almost always act as the best conductor in the earth's crust. This is due to the presence of dissolved ions either from natural or man made sources. These could include but are not limited to dumped wastes products, leaking subsurface storage facilities, the creation of acid underground, chemical reactions occurring subsurface, the injection of in situ leach solutions, or conductivity changes resulting from biological activity.

The technique of this invention uses either direct (DC) or alternating (AC) current. A constant DC current source produces a field that is harder to detect with available field measuring equipment, although the use of a Josephsen junction superconductor magnetometer can be used for such a purpose. AC or pulsed DC current sources provide a stronger signal, but introduce other factors that must be corrected. Inductive effects arising from pulsed DC or AC current may result in the excitation of remote conductors. Inductive effects increase the field attenuation rate, cause refraction at the earth's surface, and generate secondary out-of-phase fields that complicate the measurements. The resultant field from two or more out-of-phase electromagnetic fields will be "elliptically polarized." Thus, it is necessary to completely describe this field by measuring the direction and amplitude of both the major and minor ellipses axes, and their phase relationship with the respect to the electrode current. The signal from the desired source is enhanced because of the direct energizing of the solutions to be studied. The signal is further enhanced by using a source that is time or frequency locked to the receivers used to map the magnetic and electric fields.

There are three large sources of electrical noise in the ground that must be accounted for when analyzing magnetic field measurements. The first results from power companies which use the earth for their return circuit for all their power distribution. Thus, as usage changes during the day, the electrical and magnetic field produced by the returned electrical power will shift and change the electromagnetic field produced. These effects are screened by frequency locks between transmitter and receiver and corrections obtained from multiple base stations used to monitor the electromagnetic fields. The second strongest noise source is from telluric currents created by the electrical currents that the sun generates in the ionosphere. Multiple readings at a base station also help eliminate these influences. The third electrical noise source is distant thunder storms. The electrical static generated by lightning strikes becomes trapped in a wave guide between the ground and the ionosphere. Over distance, the currents generated begin to blanket the electromagnetic spectrum usable in this technology. This noise is corrected using both frequency locks and base station corrections. Frequencies utilized in this invention are selected as ones which are substantially different than any potential interfering or background frequencies.

While the use of electromagnetics to track water is based on sound theory, its practice can be quite difficult. The water being tracked may be only one of several conductors being energized or partially energized. Clay soils often act as a weak conductor producing a broad superimposed field. Nearby power lines or buried cable will produce their own fields and need to be accounted for. The depth of the water from the surface may also vary and will cause variations in the field measurements. Other potential influences include changes in ion concentration, a broadening of the water stream (sheet flow versus channel flow), and even the wire that is used to energize the water stream and connect a return electrode will generate its own magnetic field. Information concerning the physical properties at the site must then be taken into consideration when any study is undertaken and factored into all interpretation of the data.

Analysis or interpretation of the data is a multifaceted process. The data is corrected for diurnals, current drift, and any base intensity changes. For example, to correct a diurnal, it is monitored at a base station and the amount of drift or change from the original reading at the base station is added algebraically to each reading at receiver stations. Current drift of the transmitter is a linear effect on the reading. The percent of drift of the current is used as a multiplying factor applied to the field reading to correct therefor. Base intensity changes are due to changes in the conducting medium and can be either algebraically added to the field reading or treated like current drift. The anomalies and interpretation can be facilitated and enhanced by the various treatments.

The direction of electrical current flowing in the ground, represents the path of the groundwater or channel. Electric current flows in the same direction as the minimum horizontal magnetic field or perpendicular to the maximum horizontal magnetic field. Electric current flow is also in the direction of the maximum surface electrical field potential or perpendicular to the minimum surface electric field potential. The direction of electric current flow is directly correlatable to the subsurface water channels. The rate of change of the vertical magnetic field intensity across the anomaly is proportional to the width of the current path or indicates the width of the groundwater channel. Width of the horizontal magnetic field is proportional to depth and width of the channel. Correlation of vertical and horizontal magnetic data is necessary to clarify ambiguities of width and depth.

The surface electric field, when correlated with the magnetic field, provides data on the conductivity of the groundwater being tracked. Chemical or biological activity in or near the conducting groundwater will cause local intensity increases in either the magnetic or electric field through the production of current carrying ions. The location and number of detection sites affects the quality of the data collected. The sites are preferably numerous and closely spaced to generate an encompassing map of data.

To collect data, the generator 1, energizing electrode 3, return electrodes 11, and connecting wire 13 are placed on the site under investigation, as shown in FIG. 1. The generator 1 is generally located near the energizing electrode 3 for convenience. In this example, the energizing electrode 3 is placed directly into contact with the seep 5. The return electrodes 11 are placed to provide a return path for the current once it leaves the area of interest. In this example, three return electrodes 11 are used. The connecting wire 13 is placed on the ground in such a manner to minimize the effects of its magnetic field on the measurements taken.

FIG. 1 also depicts a grid 23 on regular intervals 27, marked with "X" encompassing the area to be studied. Measurements are then taken at each point on the grid 23 using a receiver (not shown in FIG. 1), but shown schematically in FIG. 3. Grid spacing is somewhat arbitrary, however smaller spacing provides improved definition of the area under investigation. Grid spacings as little as 10 feet to as large as 200 feet have been used successfully. Grid spacings outside this range should work as well, and are not precluded theoretically. In FIG. 1, the initial grid points 27 are marked with an "X". To provide additional definition in a select area it is possible to establish new grid locations 29, such as those marked with an "O" in FIG. 1, and take additional measurements at these points.

Figure 3:
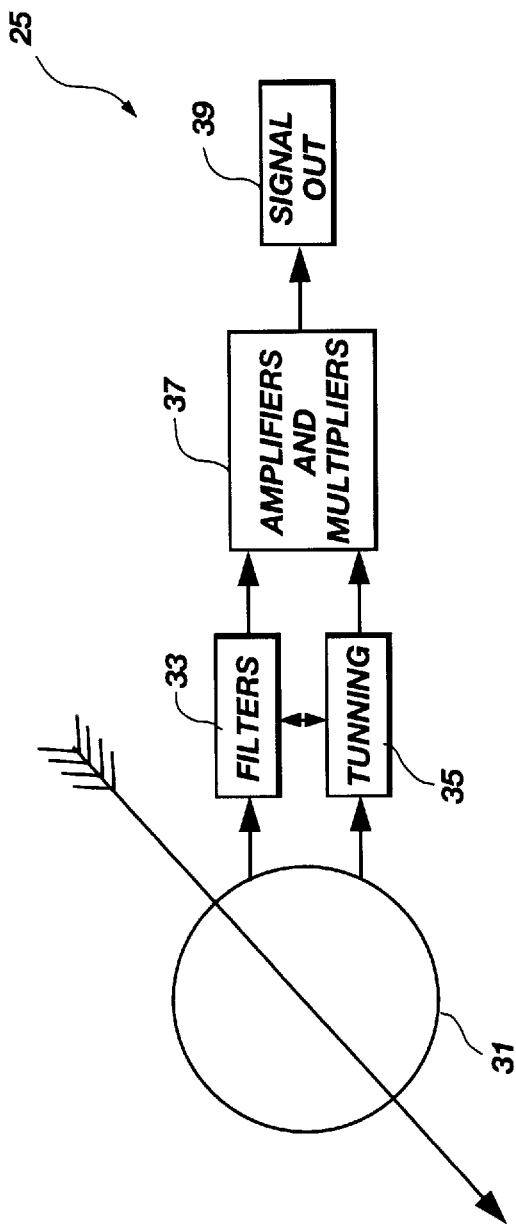
FIG. 3 is a block diagram of instrumentation used by this invention to measure the magnetic field and its component.

FIG. 3 is a block diagram of the receiver 25 used to measure the magnetic field at each of the grid points 27 or 29 of FIG. 1. The receiver 25 consists of a detecting coil 31, a filter circuitry 33, tuning circuitry 35, amplifiers and multipliers 37 to produce a signal 39 representing the relative maximum field intensity measured by voltage. These circuit components are merely representative of electronics necessary to measure a magnetic field indirectly through the current induced in a detecting coil. The sensitivity of the detecting coil can be increased by multiple loops of wire in the detecting coil.

Figure 4:
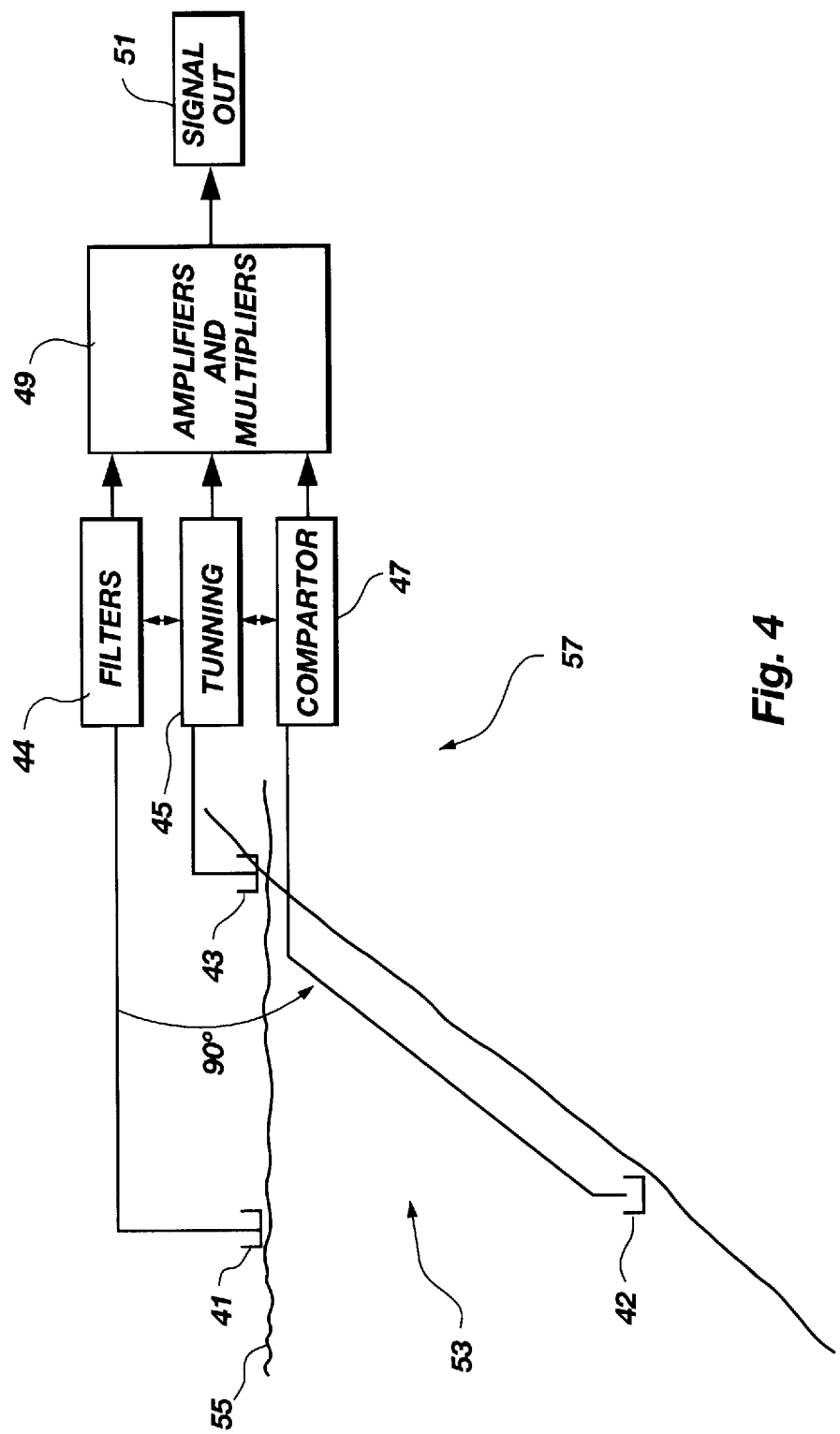
FIG. 4 is a block diagram of instrumentation used by this invention to measure the electric field and its components.

FIG. 4 shows the instrumentation 57 used to measure the electric field and its components. A first grounded electrode 41 and second grounded electrode 42 are placed at a 90 degree angle relative to each other forming an electric dipole 53. The electric dipole 53 orientation on the ground 55 is used to determine the relative electric field intensity measured by voltage of the signal out 51. The signal from the dipole 53 is referenced to a third grounded reference electrode 43. Circuitry includes: filters 44, tuning 45, comparator 47, amplifiers and multipliers 49 to produce a signal out 51. The receiver of FIG. 3 and instrumentation of FIG. 4 can be hooked up to one or more computers for data processing.

Apparatus for electromagnetically energizing a subsurface aqueous system and measuring resultant electric and magnetic fields emanating from said energized subsurface aqueous system for use in mapping and monitoring said aqueous system typically includes a transmitter capable of generating an electrical signal, preferably of a preselected frequency, a primary energizing electrode in contact with said aqueous system, an electrical conductor connecting said transmitter to a primary electrode, at least one secondary return electrode, a subsurface aqueous solution located between said primary and said secondary return electrode, an electrical conductor connecting said at least one secondary return electrode to said transmitter, at least one receiver capable of measuring surface electric field, and/or magnetic field emanating from said aqueous system when said transmitter is activated to generate an electrical current to impose a voltage upon said aqueous system, and a signal process to process and record measured data.

The receiver to measure magnetic field typically includes a coil to generate an electric current when magnetic field flux passes within said coil, a mechanism to level the coil, a mechanism to move the coil between horizontal and vertical positions, a mechanism to rotate the coil in either the horizontal position or the vertical position, and a device to measure compass coordinates of said coil, and, often additionally, an electric dipole attached to a voltage measuring device, and a means for orienting and measuring said dipole in any direction on the ground to measure the electric field.

A typical signal processor useful in this invention includes a tuning circuitry to adjust phase and frequency of measured field signals, filter circuitry to exclude undesired frequency components from said field signals, amplification circuitry to display processed signals, and memory storage to record measured data and processed data.

Structurally, a preferred receiver to measure magnetic fields detected according to the invention includes a horizontal coil to generate electric current when magnetic field flux passes within said horizontal coil, a vertical coil to generate electric current when magnetic field flux passes within said vertical coil, a mechanism to level the horizontal coil, a mechanism to level the vertical coil, a mechanism to rotate the horizontal coil about a horizontal axis, a mechanism to rotate the vertical coil about a vertical axis, a mechanism to measure the angular direction of said coils, and a device to measure compass coordinates of said receiver and in a sophisticated arrangement may include three coils in fixed orthogonal relative orientation, a mechanism to level said fixed three coils, a mechanism to orient and measure the angular coordinates of said fixed three coils, and a device to measure compass coordinates of said receiver.

The coils utilized in the practice of this invention are very sensitive to small amounts of electromagnetic fields. Preferred coils have thousands of turns of wire about the central core, which is typically a ferromagnetic material.

A preferred transmitter is one capable of generating an electrical signal of one or multiple preselected frequencies and capable of generating an electrical signal varying with an ideal current of 0.1 to 1.0 amps which may require a voltage of 0.1 to 1000 volts. These are the normal ranges but could be more or less based on site specific conditions.

A preferred signal processor useful in the apparatus of this invention comprises a computer used to tune, filter, amplify, display, and record said measured signals, said angular coil coordinates and said measured receiver compass coordinates.

To monitor a site over time, these measurements should be repeated at regular intervals, such as every two weeks or every two months, and the data then compared. Comparing the changes in the various components of magnetic and electric field over time provide information relating to fluid movement, changes in chemical activity, changes of fluid in an aquifer, changes in subsurface biological activity, movement of chemical or bio-reaction fronts, leaching progress and activity relating to in situ mining, progress of subsurface chemical or biological remediation, increases or decrease in subsurface flow, changes in salinity, or any change in the groundwater that affects any of its electrical properties. The field intensity readings are mathematically normalized for distance from the energizing electrode. As current flows down the groundwater channel, some electrical current leaks into the surrounding medium. The electrical contrast between the channel and host rock can be evaluated by the rate at which the magnetic and electric fields degrade. Data can be enhanced using distance correction factors. These correction factors are generally used in a series but could be used individually. The corrections generally follow a pattern similar to but not limited by, the fourth root of the distance, the cube root of the distance, the square root of the distance, the distance, the square of the distance, the cube of the distance, the fourth power of the distance, etc. For example, the most common corrections for dispersal of current can be expressed as one of a series of equations $$I_{channel} = C \frac{I_{injected}}{L^n} \frac{\rho_{channel}}{\rho_{surrounding\ media}}$$

where C is a constant of proportionality, $I_{channel}$ is the current in the channel, $I_{injected}$ is the current inserted at the transmitting electrode, L is the length along the channel from the energizing electrode, n=1/k, or n=k, where k is a positive integer, $\rho_{channel}$ is the resistivity in the conducting channel, $\rho_{surrounding}$ media is the resistivity of the surrounding rock or soil.

When using a series such as this, the anomalies will eventually reverse. The point of reversal is related to the dispersion of current between the groundwater channel and the surrounding media. The dip of the magnetic field is related to depth and dispersion of the ground current. Crossed electric and magnetic field gradients are related to subsurface reaction zones. Interpretation can also be facilitated by plotting the data as profiles.

There are an infinite number of potential data variations that might be interpreted. The following are representative examples of how the most common features will appear when site data is plotted in a manner similar to that of a contour map:

1. A non perturbed field, where no conductor is energized, typically forms a contour map composed of concentric circles around the point where the water is energized.
2. Water in a narrow channel will form a V shape in the contours. The gradient will be steeper the closer to the surface the channel is.
3. A vertical structure such as water flowing along a vertical fault, will also form a V-shaped contour but with a somewhat lower gradient as fields generated at depth extent of the fault structure will add to the electrical currents closer to the surface. This V shape can be sharp or subtle.
4. A flat conductor or sheet flow of water will produce a different signal. The gradient will increase toward the edge of the water then level off, only to reduce sharply on the other side. These gradients are different but could be confused with the gradual decreases in signal strength resulting from increasing distance from the energizing point. Increasing distance from the energizing point is caused by current bleeding from the conductor and finding an alternate path to the return electrode.
5. A profile of a deep narrow conductor will look very similar to a flat conductor except that the contour at the edge of a shallow flat or sheet conductor will be much more pronounced.
6. Up welling along a conductor will start with lower values due to the depth of the initial flow, then increase and narrow in the area of the up welling.
7. Branching in a conductor may show very misleading results in the area of the branch as two or more fields will be measured at one time.

8. If the water becomes less conductive or if the thickness of the water layer thins, such an area will show lower field strength as less current is carried. An example of such a situation is one where relatively fresh water passes through a reaction zone and picks up additional minerals. Measured from the high conductivity side to the low conductivity side, there will appear to be a rapid decrease in conductivity.
9. Conductors in surrounding rock or soils, even weakly conductive soils, may cause distortions in the fields measured and may even form secondary fields. A clay lens near the studied conductor, such as a landfill lining, will tend to mask the field of the conductor being tracked and could produce localized high readings in wet areas as such a lens will act as a good conductor.
10. Fields in the area of a return electrode generally show higher values inasmuch as the current is collected and concentrated at the electrodes no matter which path it has taken.
11. A study conducted over time, weeks or months, will typically show changes in field values at the same location due to changes in the flow of water, chemical changes over time (such as oxidation or acid production), or biological activity. Variations from one season to the next are to be expected due to variations in seasonal water flows.

The measured magnetic and electric fields are used to construct a model of the electrical current flow in the ground resulting from the current introduced at the energizing electrode. The resulting electrical model is then used to determine the groundwater configuration being energized. All data and the resulting maps are evaluated by an interpreter skilled in the art to locate the track and activity of the subsurface solution being monitored.

When using this technology to monitor activity such as movement, chemistry changes, or bioactivity, it is necessary to establish a reference survey. This reference survey is a base to which all subsequent surveys may be compared. The difference between the fields measured for the separate surveys are used to evaluate and determine the extent and magnitude of subsurface changes in the conducting solution under observation. This part of the technology can be used for but not limited to:
1. Track tracers (i.e., salt) solution injected in wells.
2. Monitor subsurface chemical reactions by monitoring the change in ion concentration via changes in the magnetic and electric field.
3. Where in situ leaching solutions are in use, permanent stations are established to track the reaction front, movement of the underground fluids, or areas where the solution intersects a non reactive area. For such an activity, constant monitoring may be required.
4. Biological reactions can be monitored because they affect the number of ions in the solution.

Each of these will change the flow of current in the subsurface and will result in changes in the magnetic and electric fields measured at the surface. Changes in the magnetic and electric field thus correlate directly to changes in the study area.

Following are some examples of how this technology can be used in various subsurface water monitoring applications. These are presented as examples and are not intended to cover all situations involved in tracking groundwater.
1. Groundwater, follow groundwater channels, maps groundwater structures This is the foundation technology upon which all the following applications are built. Electrical energy is injected into the groundwater of interest. The magnetic and electric fields generated by that injected current are monitored, measured and used to map its course from the surface.
2. Track and monitor subsurface pollution plumes An electrode is placed in the contaminated plume, and electrical energy is injected. The electromagnetic fields generated by the contaminated plume are used to map the plume and identify any branches that might go undetected by a systematic drilling program.
3. Locate the source and feeder system of springs or seeps An electrode is placed in the seep or spring. A wire is extended from the injection electrode to return electrodes in the suspected path of the water. This wire, the electrodes, and the water, form a conducting loop. Stations are measured along selected profiles. The primary parameter of interest for this type of survey is the horizontal magnetic field measurement which is determined by measuring the current generated at a receiving station by magnetic field flux lines passing through a single or multiple turn coil. The data are corrected for drift, distance, and current variations. Interpretation involves three types of data: (1) contours of corrected horizontal magnetic field, (2) profiles of the horizontal magnetic field, and (3) vectors of the minimum horizontal magnetic field.
4. Map interconnected fracture or porous zones Place an electrode in one zone and the return electrode in the second. By mapping the surface magnetic and electric fields the interconnection of water between the two zones can be identified, and mapped on the surface. Variations in the contour of the surface map of both the magnetic and electric field will give an indication of variations in the depth or shape of the fracture or zone surveyed.
5. Maps or trace the path of leaks in earthen dams, maps leaks in drain fields For a dam the leak is energized. The reservoir is used as the return electrode. The current will follow the water in the earthen dam back to the water in the impounded area. Thus, the path of the leak is illuminated and mapped by the resulting magnetic and electric fields.

For a drain field an electrode is placed in direct contact with the water emanating from the drain. The placement of multiple return electrodes surrounding the drain field allows the electrical current to find the best path through the drain field, which will be the water's path, to complete the electrical circuit or loop. The wire used to connect the return electrode is run as far from the area of investigation as possible to minimize the effect of its field on the study. The survey is conducted over the area covered by the drain field. Drains with water in them will be energized, and dry drain pipes will not conduct electricity so they will not be energized. Measurement of the magnetic field will map the conducting (wet) drains.
6. Monitor changes in subsurface water flow, monitor movement and changes in subsurface solutions, This technology will monitor the depression cone created by pumping subsurface water yielding information on the lateral extent of draw down. The dispersion cone decreases the volume of the electrical conductor in the area, decreasing its ability to conduct electricity as well resulting in a decrease in the electromagnetic field. The replenishment of the cone results in a subsequent increase in nearby electromagnetic fields. By following the decrease or increase in electromagnetic field it is possible to track and monitor the movement of the depression cone. Changes in the electromagnetic field can also be used to detect the direction of flow that replenishes the depression cone.
7. Monitor changes in ion concentration in groundwater, monitor in situ leaching solution, monitor solution pathways in heap leaching operations This invention can monitor changes in groundwater such as changes in volume over time or changes in conductivity due to factors such as increased dissolved solids or dilution. By directly charging the fluids involved and measuring the electromagnetic field changes as they occur, this invention can be used to accurately track the progression of solutions or reactions as they move and spread in the subsurface. Measurements using this technology are dynamic and can be conducted whenever observations are necessary to detect possible changes in the subsurface flow or concentration.

In situ mining such as solution mining is a promising and potentially environmentally-benign technology for mining metals. The technology involves the injection of leaching solutions into an ore zone at an injection well and then recovering loaded solution through recovery at production wells. It is generally assumed that all the leaching solutions injected will be recovered by withdrawing more solution, i.e., injected solution plus groundwater, than is injected. Another assumption is that sufficient information about the fracture pattern can be collected by an extensive drilling program to predict flow in the leach zone. Drilling could miss fracture zones or other porous zones within the ore body. The instant invention can locate fracture zones or other structures that could interfere or alter the flow of leaching solutions. It permits monitoring of all changes that occur during the leaching process, provides the ability to monitor the movement of solutions through the fractured ore zones, and validates the assumption that all injected solutions can be recovered and none will escape. This invention permits improved monitoring of the solution and allows the detection of stray fluid streams before they become a problem, as well as making it possible to determine the need to drill any intercept or additional collection holes required to prevent leach solutions from reaching areas surrounding the intended leach zone.

This invention further makes it possible to map the progress and course of leaching solutions in a heap leach mining operation. The process is very similar to that described for monitoring in situ leaching.

8. Monitor changes in subsurface redox or reaction fronts, monitor underground chemical reactions As chemical reactions occur underground the number of ions in solution changes. This will increase or decrease the conductivity of the groundwater. These changes can be used to detect where acid is being generated in underground locations and how active the process is. This can be used to monitor chemical reactions such as heap or in situ leaching, contaminate remediation, or biological reactions.

9. Monitor subterranean bioreaction

Bioreactions will affect and change the ion content of groundwater or other involved solutions. These changes are monitored via the variations that occur in the magnetic and electric fields. Monitoring of underground bioactivity can be used to observe the effectiveness and extent of microbes that are being used to clean up underground pollution. This technology enables monitoring the mobilization of underground substances or the changes that occur in compounds during subsurface bioremediation.

10. Subsurface waters and related geologic structures

The mapping of related geologic structures is a byproduct of mapping the location of groundwater. Structures which effect where subsurface water can or cannot move can be inferred from how groundwater is distributed.

It is further understood that this invention is not to be limited to the specific embodiments set forth herein by way of exemplifying the invention. Rather, the invention is to be limited only by the scope of the examples and attached claims including the full range of equivalency to which each element or step thereof is entitled. It should further be apparent to those skilled in the art that various changes in form and detail of the invention as shown and described may be made within the scope of the invention. It is intended that such changes are included within the spirit and scope of claims appended here to.

What is claimed is:

1. A geophysical method using electromagnetic energy for mapping, tracking, or monitoring a subsurface aqueous system comprising:

directly introducing an electrical current into said aqueous system to electrically energize said aqueous system;

monitoring at a plurality of locations the primary electric and magnetic fields emanating from said aqueous system to measure magnetic and electric fields produced by said electrical current directly introduced into said aqueous system;

wherein monitoring of said primary magnetic field consists of measuring:
      total horizontal magnetic field amplitude;
      maximum horizontal magnetic field amplitude;
      minimum horizontal magnetic field amplitude;
      vertical magnetic field amplitude;
      gradient of the magnetic field;
      direction of maximum horizontal magnetic field;
      direction of minimum horizontal magnetic field; and interpreting said measured primary electric fields and primary magnetic fields to determine extent and change in location of said aqueous system.

2. A geophysical method using electromagnetic energy for mapping, tracking, or monitoring a subsurface aqueous system comprising:

directly introducing an electrical current into said aqueous system to electrically energize said aqueous system;

monitoring at a plurality of locations the primary electric and magnetic fields emanating from said aqueous system to measure magnetic and electric fields produced by said electrical current directly introduced into said aqueous system, wherein monitoring of said primary electric field consists of measuring:
      total horizontal electric field amplitude;
      maximum horizontal electric field amplitude;
      minimum horizontal electric field amplitude;
      vector of the surface electric field;
      direction of maximum horizontal electric field;
      direction of minimum horizontal electric field; and interpreting said measured primary electric fields and primary magnetic fields to determine extent and change in location of said aqueous system.

3. The method of claim 1, wherein said measurements are performed over at least two points in time to detect changes in said magnetic field and corresponding changes in said aqueous system.

4. The method of claim 2, wherein said measurements are performed over at least two points in time to detect changes in said electric field and corresponding changes in said aqueous system.

5. A geophysical method using electromagnetic energy for mapping, tracking, or monitoring a subsurface aqueous system comprising:

directly introducing an electrical current into said aqueous system to electrically energize said aqueous system;

monitoring at a plurality of locations the primary electric and magnetic fields emanating from said aqueous system to measure magnetic and electric fields produced by said electrical current directly introduced into said aqueous system;

interpreting said measured primary electric fields and primary magnetic fields to determine extent and change in location of said aqueous system, wherein said interpreting of measured electric and magnetic fields consists of:
  a. correcting for diurnals, current drift of the transmitter, and any base intensity changes;
  b. determining a path of the aqueous system from minimum horizontal magnetic field direction or from perpendicular to maximum horizontal magnetic field;
  c. determining direction of electric current flow in the aqueous system from direction of maximum surface electrical field potential or alternatively from direction perpendicular to minimum surface electric field potential;
  d. determining width of the subsurface aqueous channel from rate of change of vertical magnetic field intensity across an anomaly;
  e. estimating depth and width of the subsurface aqueous channel from width of the measured horizontal magnetic field;
  f. resolving ambiguities of channel width and depth of said aqueous system using anomaly slope and anomaly width of vertical and horizontal magnetic field data;
  g. determining depth of said aqueous system by correlating said electric and magnetic fields;
  h. determining conductivity of the aqueous system from the measured electric field, and the measured magnetic field;
  i. determining chemical or biological activity from localized intensity increases measured in either magnetic or electric fields;
  j. comparing changes in the various components of magnetic and electric fields over time to provide information relating to fluid movement, change in chemical activity, changes of fluid in an aquifer, changes in subsurface biological activity, movement of chemical or bio-reaction fronts, leaching progress and activity relating to in situ mining, progress of subsurface chemical or biological remediation, increases or decrease in subsurface flow, changes in salinity, or any change in the groundwater that affects any of its electrical properties;
  k. mathematically normalizing electromagnetic field intensity readings for distance from the energizing electrode;
  l. evaluating electrical contrast between the channel and host rock by observing rate at which the measured magnetic and electric fields degrade;
  m. relating depth and dispersion of the ground current to the gradient of the magnetic field;
  n. relating subsurface reaction zones to crossed electric and magnetic field gradients;
  o. plotting data in profile form;
  p. plotting data as a contour map;
  q. taking account of a subsurface attached clay lens, such as a repository lining, which tends to mask the field of the conductor being tracked and could produce localized high readings in wet areas as said clay lens will act as a good conductor and concentrate current;
  r. conducting periodic surveys or sets of measurements over time, to show changes in field values which are plotted by taking the difference or ratio of measurement readings;
  s. conducting a baseline reference survey when using this method to monitor activity such as movement, chemistry changes, or bioactivity over a period of time;
  t. constructing a model of the electrical current flow in the subsurface aqueous system from the measured magnetic and electric fields.

6. The method of claim 5, wherein correcting for the diurnals consists of monitoring diurnal at base transmitter station and the amount of drift or change from the original reading at the base station is added algebraically to each reading.

7. The method of claim 5, wherein correcting for the current drift of the transmitter consists of determining the percent drift from original current and multiplying a linear factor against the measured field readings.

8. The method of claim 5, wherein correcting for the base intensity changes consists of algebraically adding to the measured field readings or treating like current drift.

9. The method of claim 5, wherein said resolving ambiguities in width and depth from said anomaly slope and said anomaly width comprises:
  identifying a deep target from a shallow slope on a wide anomaly;
  identifying a shallow wide target from a steep slope on a wide anomaly;
  identifying an edge of a pool of water from a single sided anomaly or monocline;
  determining a deep pool of water from gradual slope of a monocline; and
  determining a shallow pool of water from a steep slope of a monocline.

10. The method of claim 5, wherein said determining depth of said aqueous system by correlating said electric field and said magnetic field comprises calculating the ratio $$E/M=R$$

where E is the electric field, M is the magnetic field, whereby the value for R is large when the target is shallow; and whereby the value for R is small when the target is deep.

11. The method of claim 6, wherein said normalizing comprises:
  calculating the normalized field, $F_{normalized}$, according to $$F_{normalized}=F/r^n$$

where F is the electric or magnetic field measurement, r is the radial distance from the energizing electrode, and n is a positive integer.

12. The method of claim 5, wherein said normalizing comprises:
  calculating the normalized field, $F_{normalized}$, according to $$F_{normalized} = \frac{F}{r^{1/n}}$$

where F is the electric or magnetic field measurement, r is the radial distance from the energizing electrode, and n is a positive integer.

13. The method of claim 1, wherein said primary magnetic field measured at one or more receiver stations is measured over at least two periods of time to monitor and detect changes in subsurface aqueous system volume and quality caused by:

yearly or seasonal water table fluctuations;

water table fluctuations due to pumping;

groundwater quality; and quantity or quality of subsurface water in general.

14. The method of claim 2, wherein the electric field measured at one or more receiver stations is measured over at least two periods of time to monitor and detect changes in subsurface system volume and quality caused by:

yearly or seasonal water table fluctuations;

water table fluctuations due to pumping;

groundwater quality; and quantity or quality of subsurface water in general.

* * * * *